(No Model.)

P. FRICKER, Jr.
HOG TRAP.

No. 469,558. Patented Feb. 23, 1892.

Witnesses:
B. S. Ober
W. S. Duval

Inventor
Philip Fricker, Jr.
By his Attorneys,
C. A. Snow & Co.

UNITED STATES PATENT OFFICE.

PHILIP FRICKER, JR., OF BIRMINGHAM, KANSAS.

HOG-TRAP.

SPECIFICATION forming part of Letters Patent No. 469,558, dated February 23, 1892.
Application filed July 14, 1891. Serial No. 399,487. (No model.)

*To all whom it may concern:*

Be it known that I, PHILIP FRICKER, Jr., a citizen of the United States, residing at Birmingham, in the county of Jackson and State of Kansas, have invented new and useful Improvements in Hog-Traps, of which the following is a specification.

This invention relates to improvements in hog-traps; and the objects in view are to provide a trap adapted to receive and hold hogs during the process of branding or ringing the same and to so construct the trap as to adapt it to be readily taken apart and packed for storage or shipment.

Other objects and advantages of the invention will appear in the following description, and the novel features thereof will be particularly pointed out in the claim.

Figure 1:
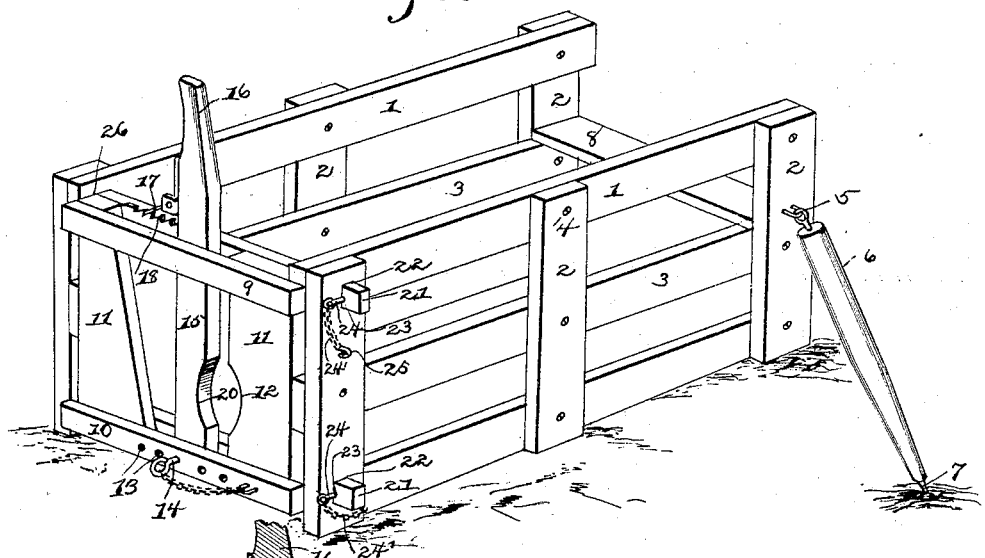
Figures 2, 3:
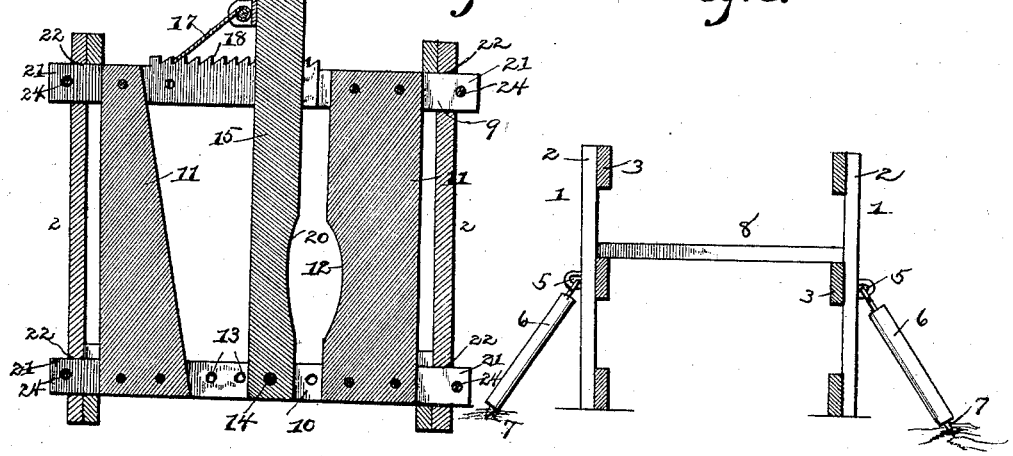

Referring to the drawings, Figure 1 is a perspective of a hog-trap constructed in accordance with my invention, the same being set up in operative position. Fig. 2 is a transverse sectional view through the front end of the trap on an enlarged scale. Fig. 3 is a similar view taken near the rear end of the trap.

Like numerals of reference indicate like parts in all the figures of the drawings.

1 designates the opposite side walls of my pen, and the same comprise a series of vertical posts and a series of connecting longitudinal rails.

2 designates the posts, and 3 the rails, said rails and posts being securely bolted together at their points of intersection, as at 4. The rear posts 2 have loosely connected to their outer sides, by means of a pair of eyes 5, a pair of braces 6, the ends of which are provided with anchoring-spikes 7, by which said braces may be anchored to the ground, and inclined so as to brace the side walls of the trap and support them securely in a vertical position. The said side walls are supported against an inward collapse by means of a removable brace 8, interposed between the two rear posts and resting on a pair of opposite post-connecting rails.

The front wall of the trap comprises an upper pair of cleats 9 and a lower pair 10, between the ends of which are interposed vertical bars 11, one of which is provided at its inner edge with a curved recess 12. The lower pair of cleats 10 are provided with a series of perforations 13 between the vertical bars 11, and through any pair of the same is passed a removable pin 14. Located between the pair of cleats and pivoted at its lower end upon the pin is a lever 15, which extends up between the cleats 9 and above the same terminates in a handle 16. A gravity-pawl 17 is loosely pivoted to the outer edge of the lever and at its free end is designed to engage with a ratchet-bar 18, formed upon the inner of the upper pair of cleats, whereby said lever may be locked in any desired position. The inner edge of the lever is provided with a shallow recess 20, which corresponds with the recess 12 of the bar 11, whereby a hog's neck may be clamped between the lever and the bar. By means of the removable pin 14 the point of pivot of the lever may be changed to any point along the lower cleats, and thus the trap adapted for large and small animals. The two inner cleats 9 and 10 are longer than the outer cleats and their extensions form tenons 21, which pass through corresponding mortises 22, formed in the front vertical posts 2 of the side walls. The mortises beyond the side walls are provided with perforations 23, through which removable pins 24 are passed for the purpose of removably locking or securing the front and side walls together. Short chains 24 are connected to the ends of the pins, and the ends of the chains are connected to staples or eyes 25, projecting from the faces of the posts. The front ends of the upper rails 3 are cut away, and being located slightly higher than the front wall the recesses 26, formed by said cut-away portions, fit over the upper ends of the front wall.

As thus constructed, it will be seen that I provide a safe and efficient, strong, and durable trap adapted to hold hogs securely while being branded or while ringing, said trap being operated upon the well-known principle. By removing the anchor-braces, the intermediate cross-bar, and the pins from the tenons the side and end walls may be disconnected and the entire structure compactly stored in a barn or other place or be packed for shipment, said structure being most readily set up whenever desired.

Slight changes in the form, proportion, and details of construction may be made without departing from the spirit of my invention.

Having described my invention, what I claim is—

In a hog-trap, the combination, with the opposite side walls comprising a series of vertical posts and a series of parallel rails bolted to the posts, the upper rail of each wall at its front end being provided with a recess, a cross-bar removably mounted upon the rails between the rear posts, and a pair of inclined braces loosely connected by eyes to the rear posts and terminating at their outer ends in anchoring points or spikes, of the front wall consisting of the upper and lower pairs of transverse cleats suitably secured together, the rear cleat of each pair terminating in tenons passing through the mortises and perforated, and pins passed through the perforations beyond the mortises and connected by chains to the side walls, the upper ends of the front wall resting in the recesses formed in the side rails of the side walls, substantially as specified.

In testimony that I claim the foregoing as my own I have hereto affixed my signature in presence of two witnesses.

PHILIP FRICKER, Jr.

Witnesses:
C. W. NOBLE,
J. H. KELLER.